No. 675,309. Patented May 28, 1901.
P. C. WARING.
FEEDING AND WEIGHING MECHANISM.
(Application filed May 1, 1900.)
(No Model.) 5 Sheets—Sheet 1.
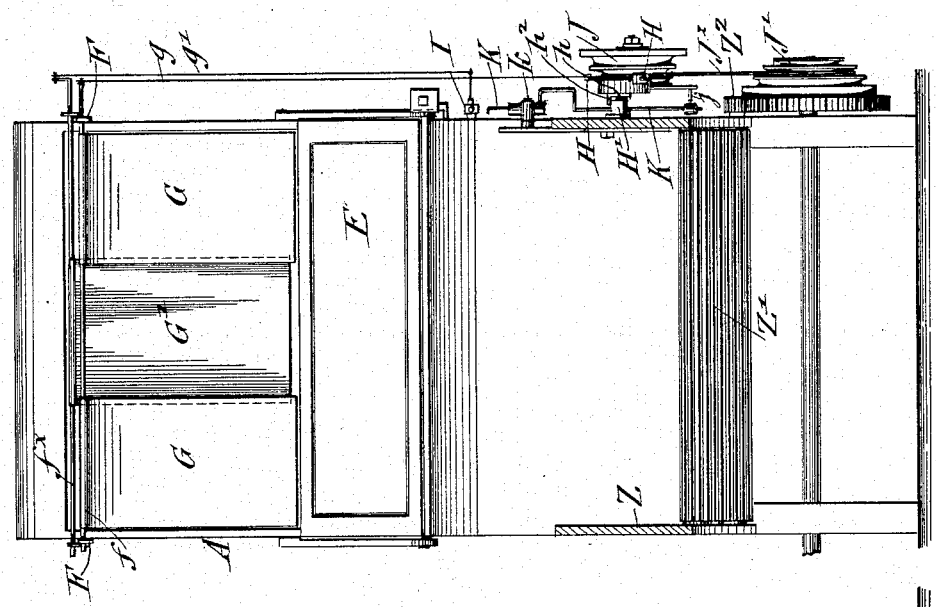
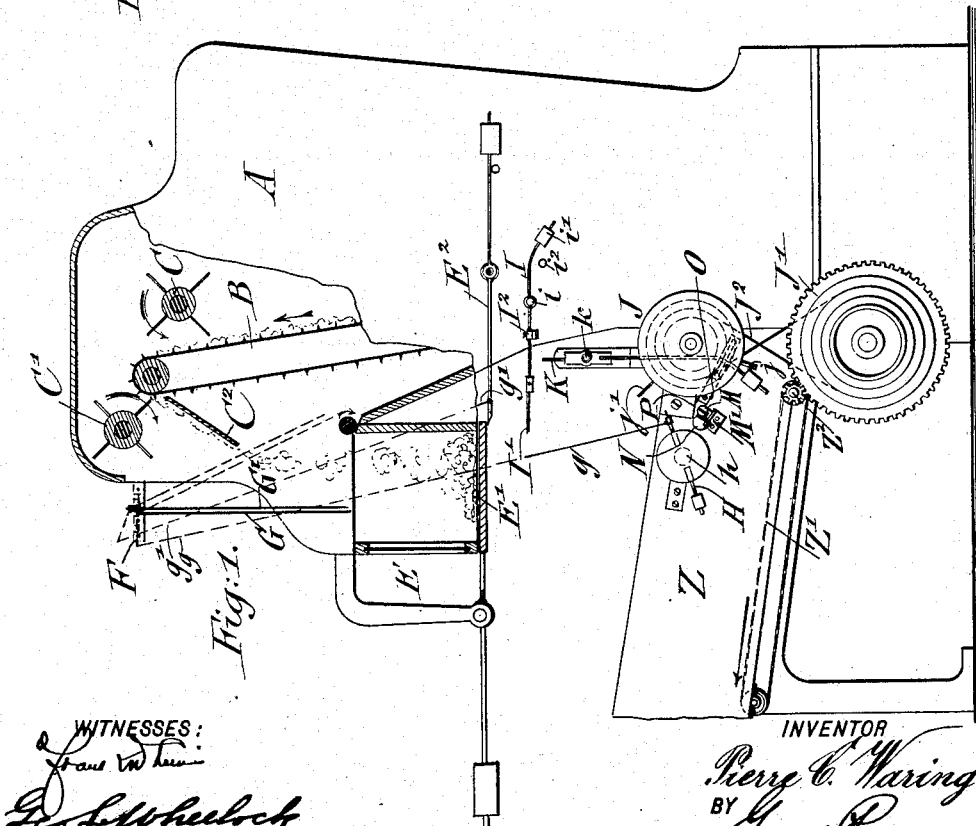
WITNESSES:
INVENTOR
Pierre C. Waring
BY
ATTORNEYS No. 675,309. Patented May 28, 1901.
P. C. WARING.
FEEDING AND WEIGHING MECHANISM.
(Application filed May 1, 1900.)
(No Model.) 5 Sheets—Sheet 2.
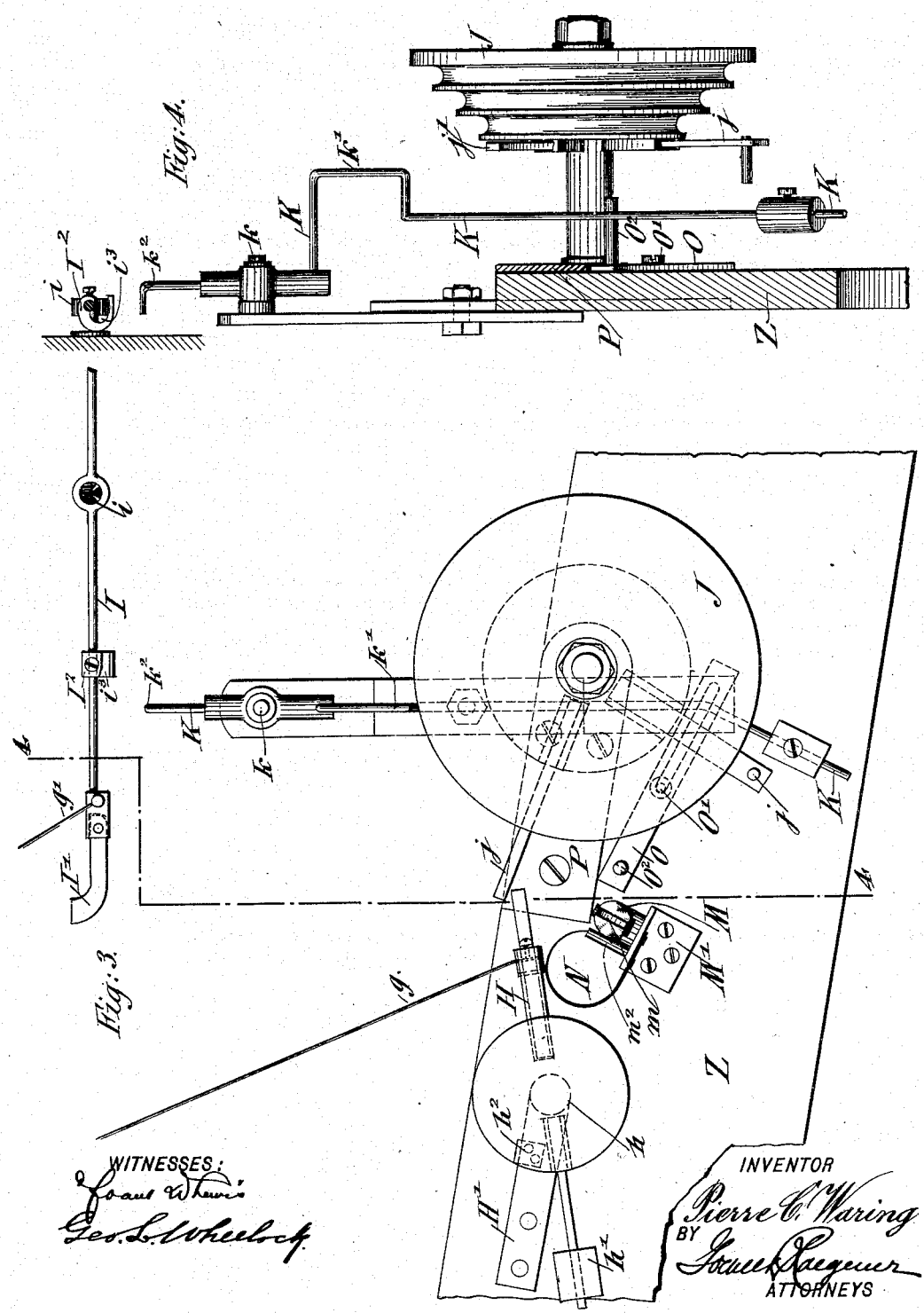
WITNESSES:
INVENTOR
Pierre C. Waring
BY
ATTORNEYS No. 675,309. Patented May 28, 1901.
P. C. WARING.
FEEDING AND WEIGHING MECHANISM.
(Application filed May 1, 1900.)
(No Model.) 5 Sheets—Sheet 3.
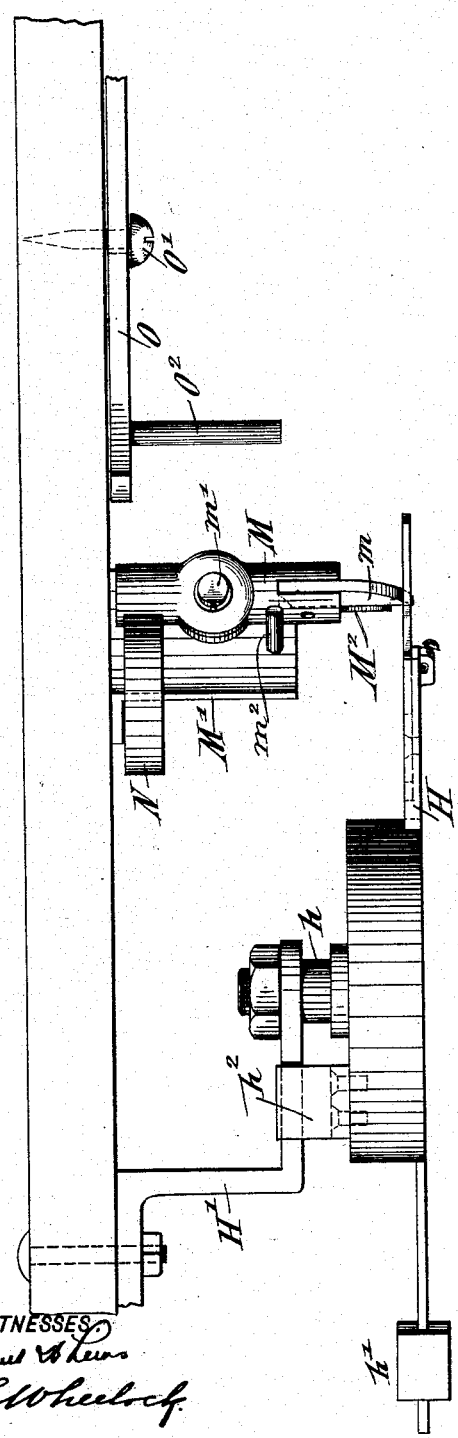
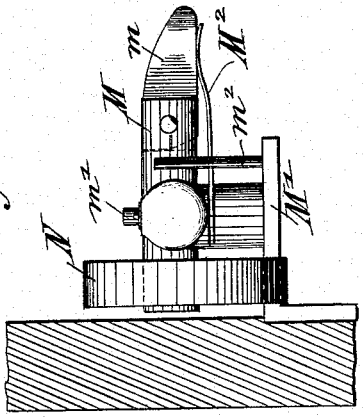
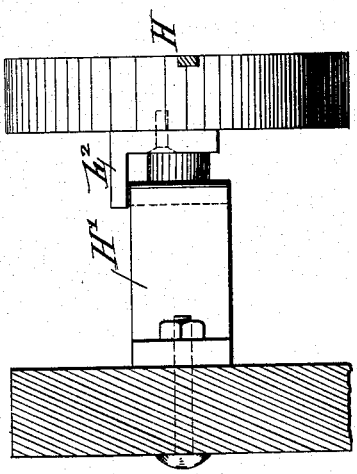
WITNESSES
INVENTOR
Pierre C. Waring
BY
ATTORNEYS

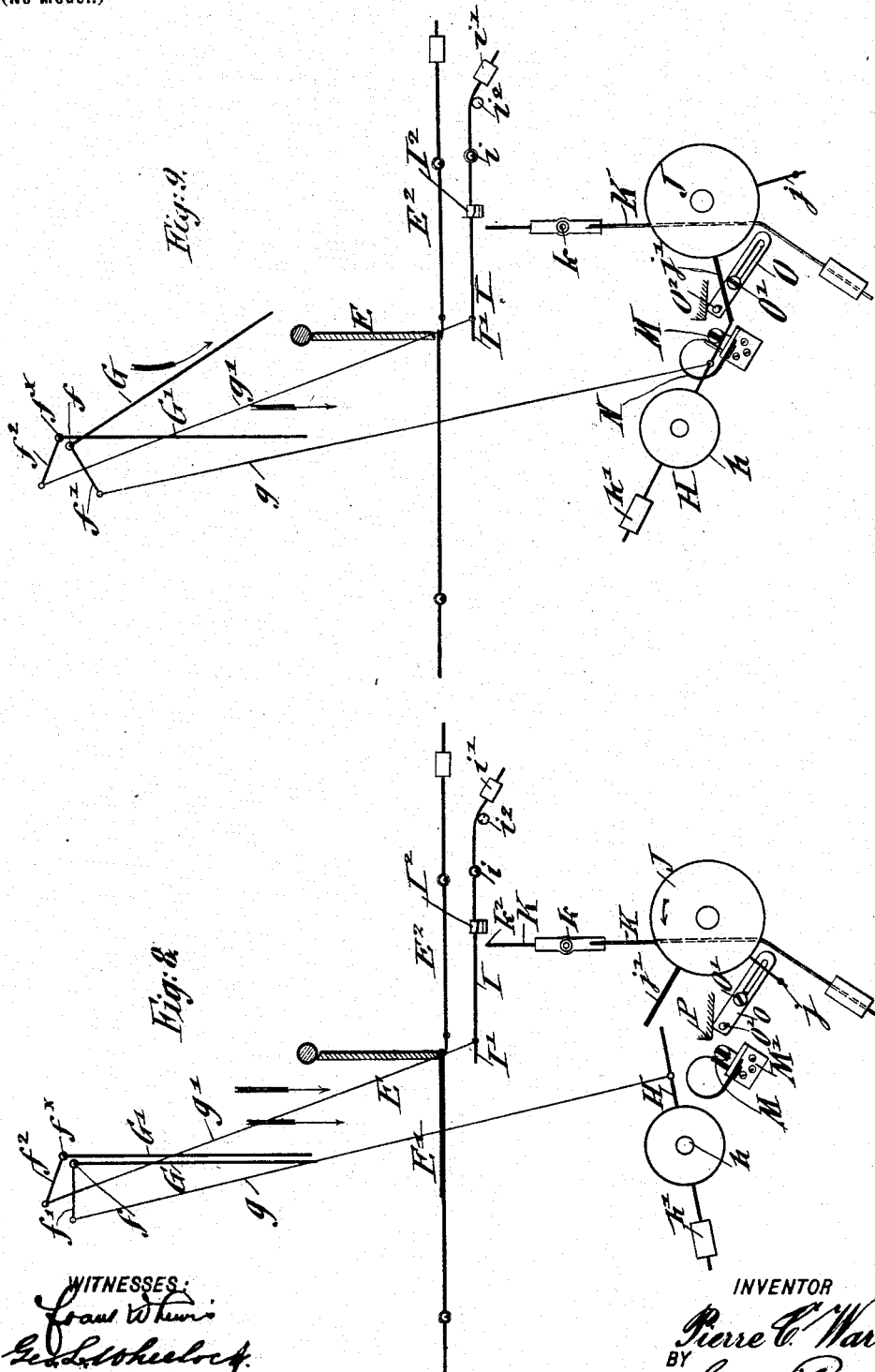

No. 675,309. Patented May 28, 1901.
P. C. WARING.
FEEDING AND WEIGHING MECHANISM.
(Application filed May 1, 1900.)
(No Model.) 5 Sheets—Sheet 5.
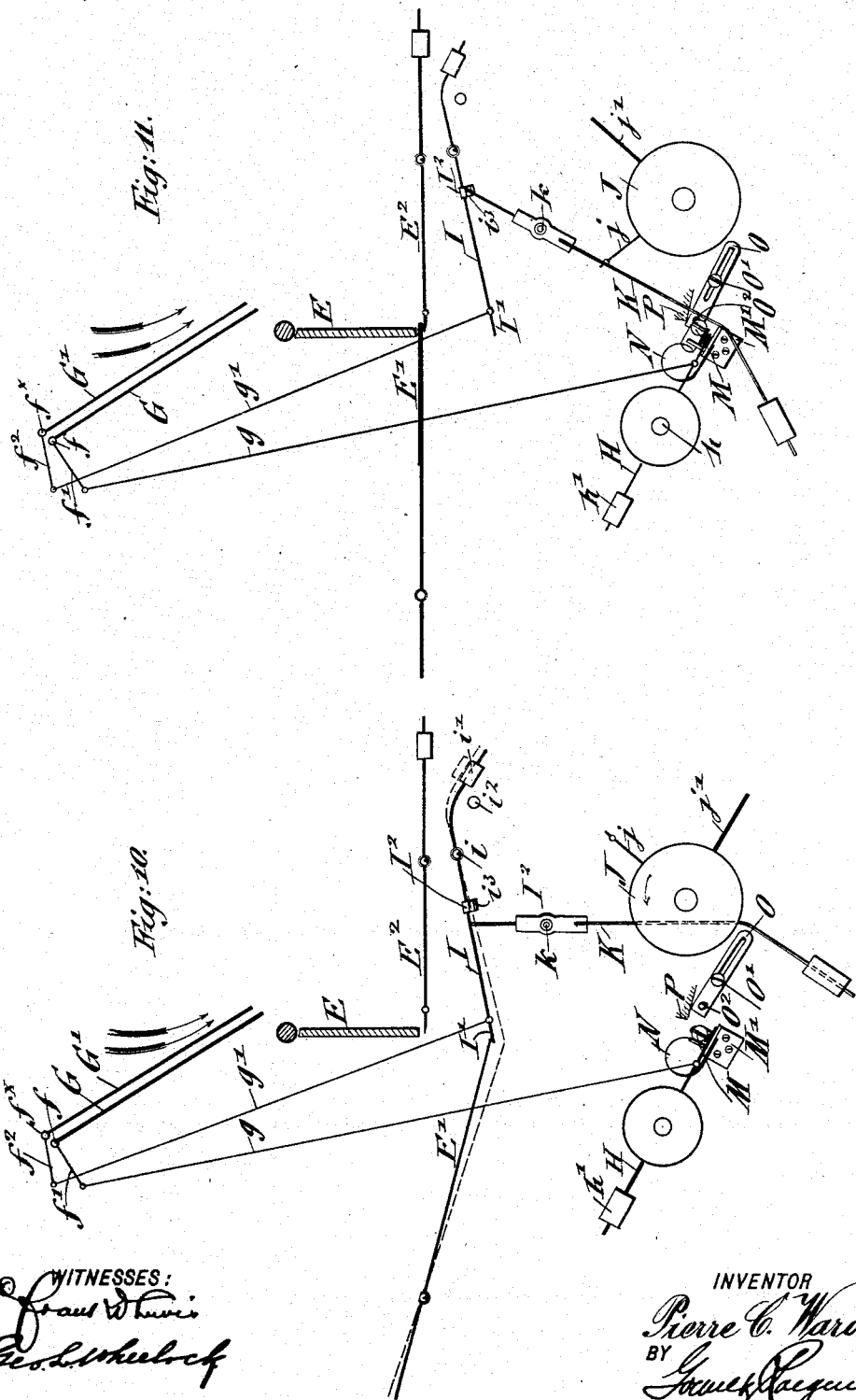
WITNESSES:
INVENTOR
Pierre C. Waring
BY
ATTORNEYS

UNITED STATES PATENT OFFICE.

PIERRE C. WARING, OF YONKERS, NEW YORK.

FEEDING AND WEIGHING MECHANISM.

SPECIFICATION forming part of Letters Patent No. 675,309, dated May 28, 1901.

Application filed May 1, 1900. Serial No. 15,048. (No model.)

*To all whom it may concern:*

Be it known that I, PIERRE C. WARING, a citizen of the United States, residing at Yonkers, in the county of Westchester and State of New York, have invented certain new and useful Improvements in Feeding and Weighing Mechanism for Hat-Body-Forming and other Machines, of which the following is a specification.

This invention relates to improvements upon automatic feeding and weighing mechanism for hat-body-forming or other machines—such as shown in my Patents No. 628,879, dated July 11, 1899, and No. 641,172, dated January 9, 1900—in which predetermined quantities of material—such as fur, wool, or other fibrous material—are automatically weighed out under certain precautions against overweight and delivered intermittently to the hat-body-forming or other machine at the end of such predetermined periods of time as may be necessary for the proper working of the hat-body-forming or other machine. In both of the said patents the aim is to reduce any liability of inaccuracy to a practical standpoint, and to that end there are used in connection with the weighing mechanism a supply-stream deflector and a controlling-lever, which lever as soon as the fully-determined quantity of fibrous or other material has been weighed out for the hat-body-forming or other machine is actuated instantaneously by the scale-pan or tilting platform, so as to move the said deflector into position to deflect the supply-stream of fibrous or other material from the weighing device back into the main hopper. In the present invention a sectional deflector, or rather a plurality of deflectors, is employed, one deflector being positively actuated at the end of a properly-timed interval, so as to deflect the main body of the supply-stream into the main hopper, leaving a smaller drip or finishing stream, which is permitted by another deflector to be deposited onto the already-accumulated material on the scale-pan and which is actuated instantly, preferably by means of the referred-to controlling-lever, but not, however, until the determined quantity of material has been weighed out to a nicety, so as to move the scale-pan slightly down, the slight downward movement of the scale-pan being thus utilized to effectuate the complete deflection of the supply-stream, so that the accurate weighing is not affected in the least. A considerable advantage is gained by shifting the main body of the supply-stream and then finishing with a drip-stream in such mechanisms as those heretofore patented by me, especially when used in connection with hat-body-forming machines, as the critical moment in the weighing out of fibrous material for a hat-body is when the weighing operation is being terminated, during which time, according to my invention, the drip-stream flows in gently and in a much less mass than the main stream and cannot for those reasons affect the predetermined weight or rack or exert undue influences on the sensitive parts of the mechanism at such critical moment, which is of the utmost importance in the manufacture of hat-bodies, that should not deviate even to the smallest fraction of an ounce, if uniform and workmanlike hats are to be turned out.

To these ends my invention consists, broadly, of mechanism of the described class in which a plurality of deflectors are employed, one deflector being operated at a suitable moment, so as to deflect the main body of the supply-stream from the scale-pan into the main hopper, and another lagging behind and permitting the flow of a small finishing or drip supply-stream, which is also deflected into the hopper the moment the predetermined quantity of material has been weighed out.

The invention further consists of certain features of construction and combinations of parts to be hereinafter described and then claimed.

In order that my invention may be more fully understood, I will now proceed to describe the same, reference being had to the accompanying drawings, in which—

Figure 1 is a side elevation of my improved feeding and weighing mechanism partly broken away. Fig. 2 is a front elevation. Fig. 3 is an enlarged detail side view of the deflector-actuating mechanism. Fig. 4 is a transverse section on line 4 4, Fig. 3. Fig. 5 is a plan view of the latch and other parts of the deflector-actuating mechanism. Figs. 6 and 7 are details of parts of said mechanism, and Figs. 8, 9, 10, and 11 are diagrams showing the different positions which the deflectors and their actuating parts assume during the weighing and discharging operation.

Similar letters of reference indicate corresponding parts throughout the drawings.

Referring to the drawings, A indicates the main hopper; B, the endless conveyer-belt or apron therein; C, the wiper; C', the clearer, and C² an inclined plate for discharging fur or other fibrous material into the box E of the weighing mechanism, which comprises besides the same a counterweighted oscillating platform or scale-pan E', for forming the bottom of the box, and a scale-beam E², which is adjusted according to the desired weight of material. The operation of the said parts is fully disclosed in said patents; but I may here remark that I do not limit myself to the construction and operation of the same—as, for instance, there are many known forms of weighing-scales *per se* that may be devised by skilled mechanicians which may be adapted to my improvements.

F indicates notched bars projecting from the upper portion of the hopper A over the weighing device and in whose notches rock-shafts $f f^\times$ are journaled adjacent to each other, said rock-shafts having crank-arms $f' f^2$ and supporting the deflectors G G'. The said deflectors extend downwardly a suitable distance toward or into the accumulating-box E, into which the fibrous material is deposited, and they consist of plates or boards of suitable material arranged on the said rock-shafts side by side, so that together they will approximately extend across the entire length of box E and will direct a wide stream of material into the same. In the arrangement which has been here chosen for said deflectors there is one central one G', arranged on shaft $f^\times$, and two others G G, arranged one on each side of deflector G' on shaft $f$, so that the combined superficial area of the deflectors G is greater than that of deflector G', and inasmuch as the deflectors G are the first to move, as hereinafter described, a greater portion of the supply-stream is thereby deflected back into the main hopper A than by the deflector G'. I do not limit myself, however, to the number of deflectors nor to the manner in which they are arranged and mounted. In the example shown the deflectors appear in front elevation as if they constituted practically one deflector with movable sections. Arms $f' f^2$ of the said deflector-carrying rock-shafts are connected, by means of cords or wires $g g'$, with controlling-levers H I, the lever H being pivoted at $h$ to a bracket H' on the box or trough Z, in which travels the endless conveyer Z' (onto which the weighed-out quantity of fur drops) and by which the fur is carried onward, so as to be finally delivered to the hat-body-forming or other machine, while the lever I is pivoted at $i$ to the side of the hopper or feed-casing A, both the levers H and I having counterweights $h'$ and $i'$, respectively, which have a tendency to permit the deflectors to move into position for discharging the material into the scale-pan. The positions of the levers H I, induced by their counterweights, are respectively limited by the lug $h^2$ on the hub of lever H, which is stopped by contact with bracket H' and by the stop-pin $i^2$, which projects under the rear end of the lever I. As regards the said lever I, it operates its deflector G' in the same manner as it operates the deflector shown in my said patents, it being provided to that end with a forward pivoted finger I', which yields upwardly, but not downwardly. For the purpose of differentiating the levers H I the former may be termed the "main" controlling-lever and the latter the "supplemental" controlling-lever.

J J' are differential grooved pulleys or wheels suitably mounted below the supplemental controlling-lever I and over which is trained a crossed belt J², which may be shifted thereon into different grooves, so as to alter the speed of the pulley J as required for maintaining the deflection of the lever I until the expiration of a predetermined interval, when the material is to be delivered to the hat-body-forming or other machine. The wheel or pulley J' is provided with teeth and is suitably driven by a pinion Z², mounted on a shaft of the conveyer-belt Z', and the wheel or pulley J is provided with bent or angular trips or pins $j j'$, which are located at a distance apart corresponding with the moment when the drip-stream is cut off and with the moment when the main body of the supply-stream is deflected back into the hopper A.

Suitably pivoted at a fixed point $k$ is a pendulum-lever K, the lower end of which is counterweighted, so as to cause the said lever to normally seek the center of gravity and to assume the position shown in Fig. 3. Lever K is bent out at $k'$ (see Fig. 4) near its pivot $k$, so as to form a contact portion for the bent end of the trip $j$, the upper end of said lever being bent into a finger $k^2$, which is adapted to arrest the downward movement of the supplemental controlling-lever I and also to take into the groove $i^3$ of a block I², which is fastened onto the said lever I.

Trip $j'$ is adapted to strike the adjacent end of main controlling-lever H and to engage the same under the pivoted toe $m$ of a latch M, which is pivoted at $m'$ (see Figs. 5 and 7) to a bracket M', fixed to the side of conveyer-box Z, said toe yielding downwardly, but not upwardly. A spring M², fixed to the latch M, acts to hold the toe $m$ in line with the latch, and a spring N, fixed to bracket M', acts on the inner end of latch M and tends to move the toe end in a plane toward the pivot of controlling-lever H, its movement being limited in that direction by a limit pin or stop $m^2$ projecting from said bracket.

The latch M is free to be moved from contact with the controlling-lever H through the medium of the pendulum-lever K, to which end a slotted push-piece O is guided on a pin O' on the frame of the machine and is provided with a projecting pin O², adapted to be struck by the said lever K, the said push-piece contacting with the latch and disengaging the same from the lever H. The said push-piece would not strike the latch M "end on" if it were not that a guide-shoulder P is so arranged above the push-piece as to deflect its contact end and direct it against the latch.

So far the description has been confined mainly to the construction; but to enable a clearer understanding of the invention the entire operation will now be described.

The main portions of the mechanism receive their motion as clearly shown in my before-referred-to patents, while the new portions of the mechanism receive their motion from the band pulley or wheel J'. The fur or other fibrous material is discharged from the endless conveyer B into the scale-pan during intermittent periods of time, which correspond with the predetermined interval when the material is to be fed into the hat-body-forming or other machine, the material being permitted to flow into the receiving-box or being deflected back into the feed-hopper, according to the position of the deflector. In Fig. 8 the parts of the mechanism by which the deflectors are operated are shown in a position corresponding with the discharge of the whole supply-stream into or upon the scale-pan E', the fibrous material in so discharging being permitted by the deflectors G G' to fall down into the receiving-box E and upon the scale-pan. The mechanism which operates the main deflectors G is so timed as that a body of fur nearly sufficient for a hat-body is weighed out before the main deflectors G are oscillated to deflect and throw the main body of the supply-stream back into the feed-hopper. To accomplish this, the rotating pulley J, which turns in the direction of the arrow, brings the trip $j'$ over so as to strike the adjacent end of the main controlling-lever H, thereby drawing down upon the connecting cord or wire $g$, oscillating the deflector or deflectors G into the position shown in Fig. 9, and locking the main controlling-lever H under the toe $m$ of the latch M. The latch M retains the lever H in locked position until it is released, as hereinafter described, at or about the moment that the supplemental controlling-lever I permits its deflector G' to return to normal position. The described parts having been moved to the position shown in Fig. 9 and the main body of the supply-stream deflected back into the feed-hopper, a drip supply-stream will flow into the receiving-box and upon the scale-pan E', it being allowed so to do by the lagging or detained deflector G'. As soon as the drip supply-stream has accumulated in the receiving-box up to the predetermined weight the scale-pan E' overbalances the scale-beam E² and drops down for a short distance until it rests, as shown in Fig. 10, upon the finger I' of the supplemental controlling-lever I, which latter is prevented from immediately falling by means of the stop or finger $k^2$ at the upper end of the pendulum-lever K. This contact of the scale-pan with a portion of the supplemental controlling-lever depresses the same sufficiently so as to cause it to exert a pull on the connecting cord or wire $g'$, thereby oscillating the drip-supply-stream deflector G' into the position shown in Fig. 10, so that the entire body of the supply-stream is deflected back into the main hopper. The trip mechanism is so timed as that the supplemental controlling-lever I is not released to allow the fur or other material to drop from the scale-pan until the expiration of the predetermined interval when the fur is to be delivered to that hat-body-forming or other machine. At the expiration of this previously-calculated time the trip $j$ strikes the pendulum-lever K and oscillates the same, so that its finger $k^2$ is engaged in the groove of the grooved block I² on the supplemental controlling-lever I, during which action the said controlling-lever is slightly depressed, so that its finger I' will be released from the scale-pan or tilting platform, thereby allowing the scale-pan to move down sufficiently to discharge its contents upon the endless conveyer Z' to be carried forward for use. The engagement of the finger $k^2$ in the grooved block I² temporarily locks said controlling-lever in position, (see Fig. 11,) but almost instantaneously releases the same, allowing time, however, for the scale-pan to discharge its contents and to rise and trip past the finger I' until it is again held in receiving position by the scale-beam, so as to receive further material. The oscillation imparted to the pendulum-lever K by the trip $j$ causes at the same time the lower end of said lever to strike the pin O² on the push-piece O and move said push-piece into engagement with the latch, overcoming its spring N' and oscillating the latch, so as to release the end of the main controlling-lever H from the pivoted toe $m$ of the latch, thereby returning the deflector G to normal position by relaxing the pull on the connecting cord or wire $g$, while at the same time the returning of the supplemental controlling-lever I to normal position causes it to relax its pull on the connecting cord or wire $g'$, thereby permitting the drip-stream deflector G' to also return to normal position, so that the parts will be in a position about as shown in Fig. 8. The entire supply-stream will now flow onto the scale-pan.

By the described construction and operation it will be observed that the deflector or deflectors for the main body of the supply-stream are actuated positively without in the least influencing the accuracy of the weighing device proper and that the supplemental controlling-lever I, such as shown and described in my aforesaid patents, does not influence the weighing device proper. The controlling-lever I does not require great force to operate the same and is very sensitive, owing to the fact that it simply has to return the small or drip stream to the main hopper. The advantages gained by deflecting the main body of the supply-stream into the main hopper and finishing with a drip supply-stream in this class of mechanism have been stated, and I may further add, however, that it is evident that the means for controlling the main body of the supply-stream and the means for controlling the drip supply-stream may be modified in various details without departing from the spirit and scope of the invention, the invention residing, mainly, in the plurality of deflectors. It is also evident that the motions of the deflectors may be controlled at suitable intervals either mechanically or electrically, depending upon the moment when the predetermined quantity of material has been weighed out.

Having thus described my invention, what I claim as new, and desire to secure by Letters Patent, is—

1. The combination, with a hopper, means for feeding suitable material from an opening in the upper part of the hopper, and a weighing device whereby predetermined quantities of material are weighed, of a plurality of deflectors in front of said opening in the hopper, means independent of the weighing device for operating one of said deflectors during the weighing, whereby the supply-stream is divided so that a part flows along and is guided downwardly by the shifted deflector back into the lower part of the hopper, and means for operating the remaining deflector, instantly the predetermined quantity of material has been weighed, for deflecting the remaining drip supply-stream back into the lower part of the hopper, substantially as set forth.

2. The combination, with means for feeding, and means for weighing suitable material, of a deflector mounted so as to permit the main body of the supply-stream to feed to the scale-pan and to deflect and return the said main body to the feeding means, a second or drip supply-stream deflector mounted so as to permit the drip supply-stream to feed to the scale-pan and to deflect and return the drip supply-stream to the feeding means upon the weighing of the predetermined quantity of material, means independent of the weighing means for moving the main deflector into deflecting position for returning the surplus of the main body, means for moving the drip-supply-stream deflector into deflecting position instantly upon the completion of the weighing for returning the surplus of the drip supply-stream, and means, coöperating with the means for moving the deflectors into position for returning the supply-stream, for maintaining the material-returning position of the deflectors during the time between the completed weighing of the predetermined quantity of material and the unexpired portion of the interval when it is to be delivered to the hat-body-forming or other machine, substantially as set forth.

3. The combination, with means for feeding, and means for weighing suitable material, of a plurality of deflectors, one of which is adapted to deflect the main body of the supply-stream back to the feeding means and the other to deflect the remaining drip supply-stream, a main controlling-lever connected with the deflector for the main body of the supply-stream, a supplemental controlling-lever connected with the deflector for the drip supply-steam, and timed tripping mechanism for actuating the main controlling-lever independent of the weighing means and for releasing the supplemental controlling-lever at the expiration of a predetermined interval, substantially as set forth.

4. The combination, with means for feeding and means for weighing suitable material, of means for acting on the supply-stream to intercept its feed to the weighing means, the same comprising a main controlling-lever, a supplemental controlling-lever, a latch, means for engaging the main controlling-lever with the latch, a pendulum-lever, and means for moving said pendulum-lever to engage a portion of the said supplemental controlling-lever and to operate said latch to disengage it from the main controlling-lever, substantially as set forth.

5. The combination, with means for feeding and means for weighing suitable material, of a plurality of deflectors, one of which is adapted to deflect the main body of the supply-stream from the means for weighing and the other to deflect the remaining drip supply-stream, a main controlling-lever connected with the deflector for the main body of the supply-stream, a supplemental controlling-lever connected with the deflector for the drip supply-stream, a latch, means for engaging the main controlling-lever with the latch, a pendulum-lever, and means for moving said pendulum-lever to engage a portion of said supplemental controlling-lever and to operate said latch to disengage it from the main controlling-lever, substantially as set forth.

In testimony that I claim the foregoing as my invention I have signed my name in presence of two subscribing witnesses.

PIERRE C. WARING.

Witnesses:
JULIUS TACHMAN,
L. W. KETCHUM.